(12) United States Patent
Laakso et al.

(10) Patent No.: US 11,945,687 B2
(45) Date of Patent: Apr. 2, 2024

(54) ELEVATOR SYSTEM AND A METHOD FOR OBSERVING A MISOPERATION

(71) Applicant: Kone Corporation, Helsinki (FI)

(72) Inventors: Matti Laakso, Helsinki (FI); Jouko Kinnari, Helsinki (FI)

(73) Assignee: Kone Corporation, Helsinki (FI)

(*) Notice: Subject to any disclaimer, the term of this patent is extended or adjusted under 35 U.S.C. 154(b) by 1375 days.

(21) Appl. No.: 16/299,352

(22) Filed: Mar. 12, 2019

(65) Prior Publication Data

US 2019/0210833 A1    Jul. 11, 2019

Related U.S. Application Data

(63) Continuation of application No. PCT/FI2016/050739, filed on Oct. 20, 2016.

(51) Int. Cl.
*B66B 5/00* (2006.01)
*B66B 1/34* (2006.01)

(52) U.S. Cl.
CPC .......... *B66B 5/0018* (2013.01); *B66B 1/3453* (2013.01); *B66B 5/0025* (2013.01)

(58) Field of Classification Search
CPC ... B66B 5/0018; B66B 1/3453; B66B 5/0025; G06F 11/3452; G06F 2201/805; G06F 2201/835; G06F 11/3013
See application file for complete search history.

(56) References Cited

U.S. PATENT DOCUMENTS

2011/0315490 A1* 12/2011 Shi .................. B66B 5/0025
187/393

FOREIGN PATENT DOCUMENTS

| CN | 104627769 A | 5/2015 |
|----|-------------|--------|
| CN | 104909234 A | 9/2015 |
| EP | 1164105 A2  | 12/2001 |
| JP | H08225266 A | 9/1996 |
| JP | H09240948 A | 9/1997 |

(Continued)

OTHER PUBLICATIONS

Chinese Office Action dated Mar. 2, 2020 issued in corresponding Chinese Application No. 201680089849.8.

(Continued)

*Primary Examiner* — Jeffrey Donels
(74) *Attorney, Agent, or Firm* — Harness, Dickey & Pierce, P.L.C.

(57) ABSTRACT

The invention relates to an elevator system for observing a misoperation. The elevator system comprises an observation unit and a processing unit. The observation unit is configured to obtain data representing movement of an elevator car during a predetermined time interval and transmit the obtained data to the processing unit. The processing unit is configured to receive and store the data representing the movement of the elevator car, generate at least one statistical parameter from the received data, compare the at least one generated statistical parameter to at least one previously stored statistical parameter of the corresponding time interval, and generate a signal indicating a misoperation in response to a detection that the at least one generated statistical parameter deviates from the corresponding previously stored statistical parameter over a predetermined limit. The invention also relates to a method for observing a misoperation.

10 Claims, 3 Drawing Sheets

(56) References Cited

FOREIGN PATENT DOCUMENTS

| JP | 3456821 B2 | 10/2003 | | |
|---|---|---|---|---|
| WO | WO-0114237 A1 | 3/2001 | | |
| WO | WO-2015022185 A1 | * | 2/2015 | ........... B66B 5/0018 |
| WO | WO-2015074958 A1 | * | 5/2015 | ............... B66B 1/36 |

OTHER PUBLICATIONS

International Search Report, PCT/ISA/210, for International App. No. PCT/FI2016/050739, dated Feb. 16, 2017.
Written Opinion, PCT/ISA/237, for International App. No. PCT/FI2016/050739, dated Feb. 16, 2017.

* cited by examiner

ELEVATOR SYSTEM AND A METHOD FOR OBSERVING A MISOPERATION

This application is a continuation of PCT International Application No. PCT/FI2016/050739 which has an International filing date of Oct. 20, 2016, the entire contents of which are incorporated herein by reference.

TECHNICAL FIELD

The invention concerns in general the technical field of elevator technology. Especially the invention concerns observing a condition of an elevator.

BACKGROUND

Typically an elevator comprises an elevator car and a hoisting machine configured to drive the elevator car in an elevator shaft between landings. There may occur several misoperations, such as failures or malfunction, in the operation of the elevator. In most cases when a misoperation occurs the operation, such as the movement, of the elevator car is stopped and the operation of the elevator may not continue before the elevator is fixed. Typically, a user of the elevator is the one who notices the failure or the malfunction first and informs an elevator service unit, such as service personnel, service center, service company or similar. Alternatively or in addition, an automated notification, for example in form of at least one failure code, may be delivered directly from an elevator control system, for example, to the elevator service. After that a maintenance personnel may be instructed to fix the problem in the elevator.

Typically it may take a long time for the information about a failure in the elevator to reach from the user of the elevator or the elevator control system to the elevator service unit. Furthermore, when the failure or malfunction is noticed the operation of the elevator car is already stopped and there may be a long delay between the noticing of the failure or malfunction and the repair of the elevator.

According to one prior art solution a simple "elevator moves/does not move"-indicator unit may be provided for example with an accelerometer and an accompanying monitoring device installed in the elevator car. Alternatively, the "elevator move/does not move"-information may be sent directly from the elevator control system to the elevator service unit. The drawback of the prior art solution is that the information about the failure of the elevator is provided to the elevator service unit, when the elevator has already stopped operating completely. Thus, it is already too late to make any preventive actions and the problems must be fixed immediately, because the elevator is inoperative during the time when the elevator is not fixed.

Thus, it would be advantageous to keep the delay between noticing the failure or malfunction and fixing the elevator as short as possible. It would be even more advantageous if the problem may be fixed before the elevator stops operating.

SUMMARY

An objective of the invention is to present an elevator system and a method for observing a misoperation. Another objective of the invention is that the elevator system and the method for observing a misoperation improve at least partly the detection of a misoperation of an elevator solution.

The objectives of the invention are reached by an elevator system and a method as defined by the respective independent claims.

According to a first aspect, an elevator system for observing a misoperation is provided, wherein the elevator system comprises an observation unit configured to obtain data representing movement of an elevator car during a predetermined time interval, and transmit the obtained data to a processing unit; and the processing unit configured to receive and store the data representing the movement of the elevator car, generate at least one statistical parameter from the received data, compare the at least one generated statistical parameter to at least one previously stored statistical parameter of the corresponding time interval, and generate a signal indicating a misoperation in response to a detection that the at least one generated statistical parameter deviates from the corresponding previously stored statistical parameter over a predetermined limit.

The data representing the movement of the elevator car may be at least one of the following: origin and destination floor pair, travel time between the origin and destination floor, standing time at the origin floor.

Furthermore, the statistical parameter may be derived from at least one of the following: total number occurrences of each origin and destination floor pair, average travel time between the origin and destination floor, standard deviation of the travel time between the origin and destination floor, variance of the travel time between the origin and destination floor, average standing time at the origin floor, standard deviation of the standing time at the origin floor, variance of the standing time at the origin floor.

Moreover, the comparison may be based on a statistical test.

The observation unit may comprise at least one sensor for obtaining the data representing the movement of the elevator car.

Furthermore, the observation unit may be implemented as one of the following: a discrete device fixed to the elevator car, a part of an elevator control system.

Alternatively or in addition, the processing unit may be an external unit communicatively coupled to the observation unit.

Moreover, the generated signal indicating the misoperation may be transmitted to an external computing unit communicatively coupled to the processing unit.

According to a second aspect, a method for observing a misoperation of elevator is provided, wherein the method comprises obtaining and storing data representing movement of an elevator car during a predetermined time interval, generating at least one statistical parameter from the received data, comparing the at least one generated statistical parameter to at least one previously stored statistical parameter of the corresponding time interval, and generating a signal indicating a misoperation in response to a detection that the at least one generated statistical parameter deviates from the corresponding previously stored statistical parameter over a predetermined limit.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the invention are illustrated by way of example, and not by way of limitation, in the figures of the accompanying drawings.

DESCRIPTION OF SOME EMBODIMENTS

The usage of an elevator may be different on different days or different times during the day. For example, in an office building an elevator may be in a heavy use during weekdays and especially during morning and afternoon, when people are coming to the office or leaving the office. For example, between 7:30 AM and 9:00 AM and/or between 3:00 PM and 6:00 PM. On the other hand the usage of the elevator may be minor during weekends and/or when the office building is closed, for example. Furthermore, the usage of the elevator may be very similar to the usage of the same elevator in the previous week on the same day during the same period of time.

Any changes to the usage of the elevator may indicate problems with the operation of the elevator. The problem may be a misoperation of the elevator. Some non-limiting examples of the misoperation of the elevator may be an accident, a malfunction, a failure, a wear. Alternatively or in addition, a significant change in the usage itself may provide important information to a building owner for example regarding the traffic of people in the building.

Figure 1:
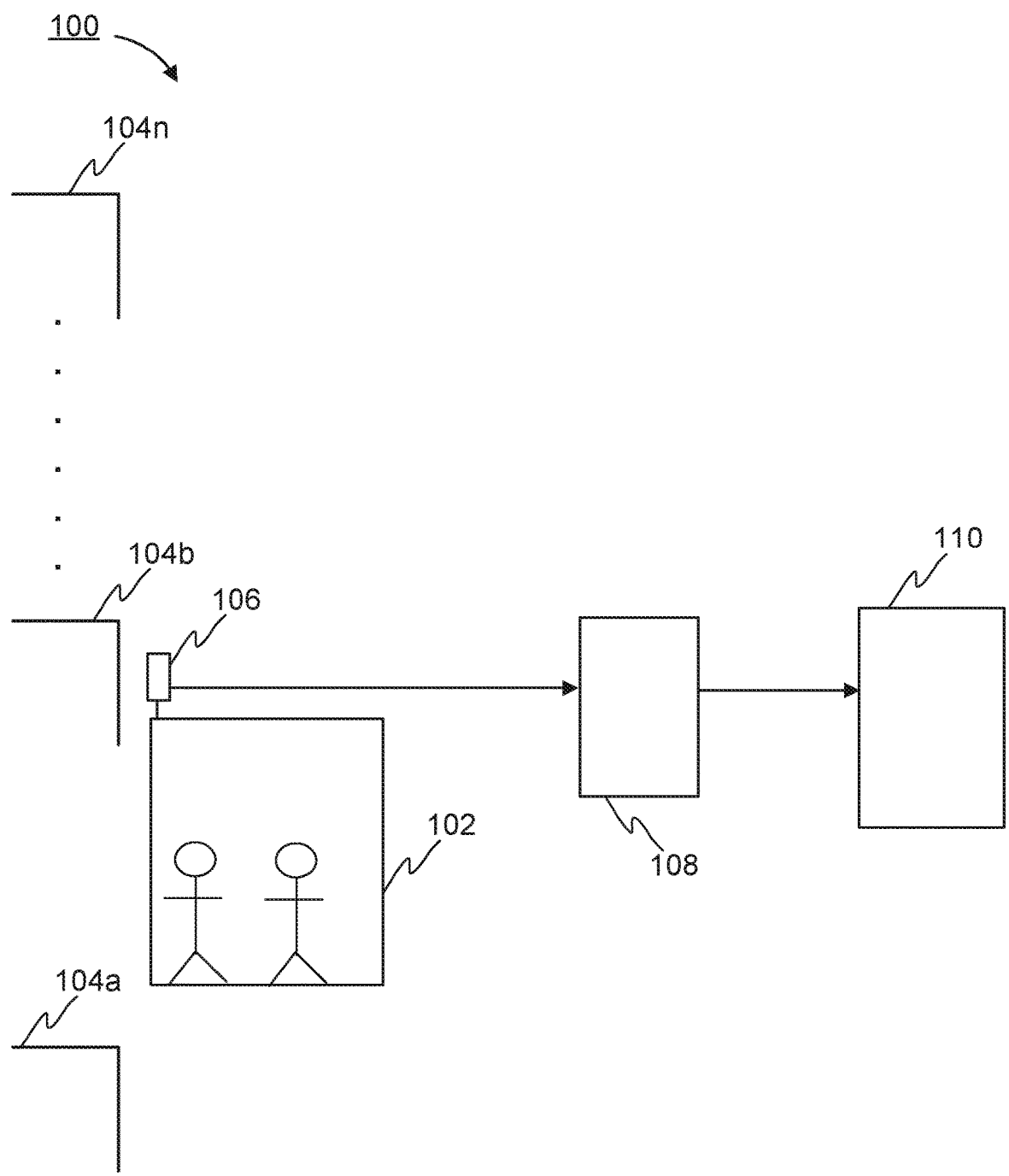
FIG. 1 illustrates schematically an example of an elevator system, wherein the embodiments of the present invention may be implemented.

FIG. 1 illustrates schematically an example of an elevator, wherein the embodiments of the present invention may be implemented as will be described. The elevator may comprise an elevator car 102 and a hoisting machine configured to drive the elevator car 102 in an elevator shaft between floors 104a-104n. An elevator control system may be configured to control the operation of the elevator. For sake of clarity the hoisting machine, elevator shaft, and elevator control system are not shown in FIG. 1. An elevator system 100 for observing a misoperation of an elevator according to the present invention may be implemented to the example elevator illustrated in FIG. 1. The elevator system 100 comprises an observation unit 106 and a processing unit 108. The elevator system 100 may further comprise an external computing unit 110.

The observation unit 106 may be configured to observe the movement of the elevator car 102. The observation comprises tracking the floor numbers to which the elevator car 102 is configured to move, travel times between the floors, and standing times at floors. In other words, the observation unit 106 is configured to obtain data representing the movement of the elevator car 102 during a predetermined time interval. The predetermined time interval may be any fixed time interval, for example 15 minutes, 1 hour, 2 hours and so on. The data representing the movement of the elevator car 102 may be at least one of the following: origin and destination floor pair, travel time between the origin and destination floor, standing time at the origin floor. The origin floor is the floor, from which the movement of the elevator car 102 begins. The destination floor is the floor, where the movement of the elevator car 102 stops. The movement of the elevator car 102 in the context of this application may be defined so that one movement of the elevator car 102 occurs when the elevator car moves from one floor to another floor.

The observation unit 106 is further configured to transmit the obtained data representing the movement of the elevator car 102 to the processing unit 108. The observation unit 106 and the processing unit 108 may be communicatively coupled to each other. The communication between the observation unit 106 and processing unit 108 may be based on one or more known communication technologies, either wired or wireless. The observation unit 106 may be configured to transmit the data constantly. In other words the observation unit 106 may be configured to transmit the obtained data to the processing unit 108 after each movement of the elevator car 102. Alternatively or in addition, the observation unit 106 may be configured to transmit the obtained data after the observation of the whole predetermined time interval. In other words the observation unit 106 is configured to obtain the data representing the movement of the elevator car 102 during the predetermined time interval and transmit the obtained data after the predetermined time interval.

Figure 2:
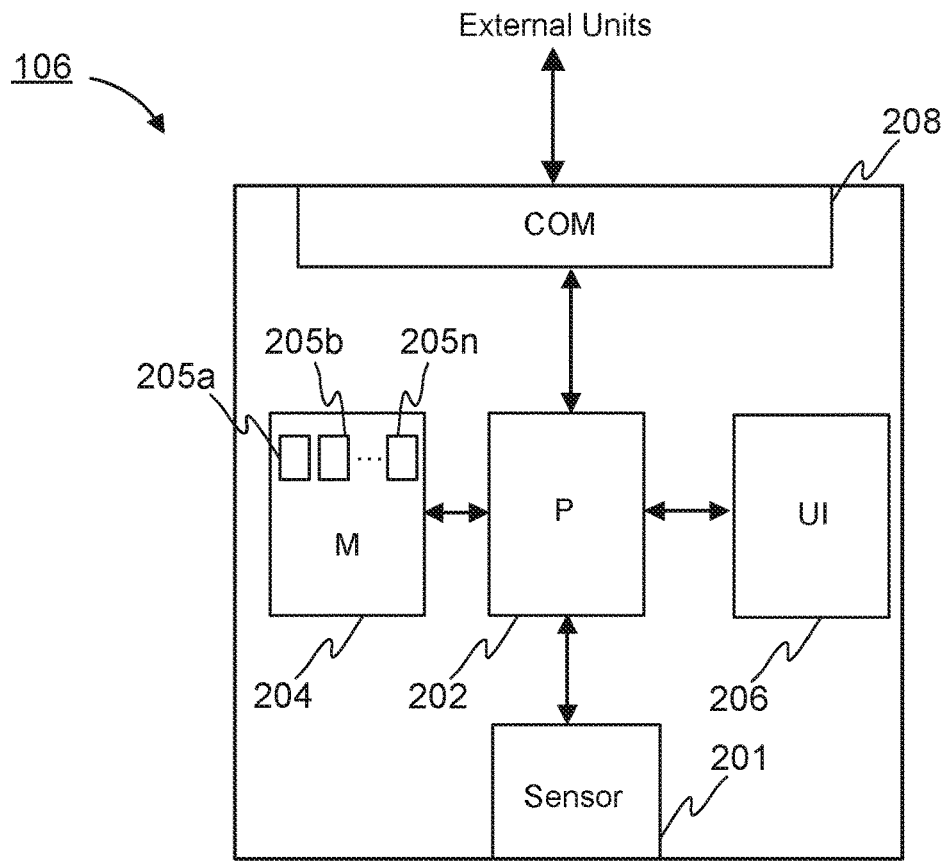
FIG. 2 illustrates schematically an example of an observation unit according to the present invention.

FIG. 2 illustrates schematically an example of the observation unit 106 according to the present invention. The observation unit 106 may comprise at least one sensor 201 for obtaining the data representing the movement of the elevator car 102. The at least one sensor 201 may be any sensor that may be used to indicate the movement of the elevator car 102. A non-limiting example of the at least one sensor 201 may be an acceleration sensor, an absolute position sensor, a magnetic sensor. The at least one sensor 201 may be an internal sensor as shown in FIG. 2. Alternatively or in addition, the at least one sensor 201 may be an external sensor. Furthermore, the observation unit 106 may comprise at least one processor 202, at least one memory 204 for storing at least portions of computer program code 205a-205n and any data values, and possibly one or more user interface units 206. The observation unit 106 may further comprise a communication interface 208 for communication with any other units, such as processing unit 108, database, and/or any external unit. The mentioned elements of the observation unit 106 may be communicatively coupled to each other with e.g. an internal bus.

The at least one processor 202 of the observation unit 106 is at least configured to implement at least some operations as described above. The processor of the observation unit 106 is thus arranged to access the at least one memory 204 and retrieve and store any information therefrom and thereto. For sake of clarity, the processor 202 herein refers to any unit suitable for processing information and control the operation of the observation unit 106, among other tasks. The operations may also be implemented with a microcontroller solution with embedded software. Similarly, the at least one memory 204 of the observation unit 106 is not limited to a certain type of memory only, but any memory type suitable for storing the described pieces of information may be applied in the context of the present invention. The at least one memory 204 may be volatile or non-volatile.

The processing unit 108 is configured to receive the data presenting the movement of the elevator car 102 transmitted from the observation unit 106. Furthermore, the processing unit 108 may be configured to store the received data. Moreover, the processing unit 108 is configured to generate at least one statistical parameter from the received data. The movements of the elevator car 102 may be divided to the origin and destination floor pairs and the number of occurrences of each origin and destination floor pair during the predetermined time interval may be defined in order to generate the total number of occurrences of each origin and destination floor pair. For each origin and destination floor pair the average, standard deviation, and/or variance of the travel time between the origin and destination floor may be defined. Furthermore, the average, standard deviation, and/or variance of the standing time at the origin floor may be defined for each origin and destination floor pair.

The generated statistical parameter may be derived from at least one of the following: total number occurrences of each origin and destination floor pair, average travel time between the origin and destination floors, standard deviation of the travel time between the origin and destination floors, variance of the travel time between the origin and destination floors, average standing time at the origin floor, standard deviation of the standing time at the origin floor, variance of the standing time at the origin floor. Alternatively or in addition, the generated statistical parameter may be derived from a combination of the above presented parameters.

Furthermore, the processing unit 108 is configured to compare the generated at least one statistical parameter to at least one previously stored statistical parameter of the corresponding time interval. The corresponding time interval means in the context of this application the same time interval, but at least one comparison period before the predetermined time interval in question, during which the present data is obtained. The comparison period may be for example, a week, 24 hours, 12 hours or something else. For example if the comparison period is one week, the corresponding time interval is the same day and the same times, for example the movement of the elevator car may be observed on Monday between 7.30 AM and 9.00 AM and the generated statistical parameter from the obtained data is compared to a stored previous statistical parameter of the previous Monday between 7.30 AM and 9 AM. The comparison may be provided so that the generated at least one statistical parameter is compared to one corresponding time interval. Alternatively or in addition, the comparison may be provided so that the generated at least one statistical parameter is compared to a multiple corresponding time intervals. The comparison may be based on a statistical test, such as equality of averages, equality of variances, compatibility test of probability distributions, for example.

A deviation of the at least one generated statistical parameter from the corresponding previously stored statistical parameter over a predetermined limit indicates a misoperation of the elevator. The processing unit 108 is configured to generate a signal indicating the misoperation in response to a detection that the at least one generated statistical parameter deviates from the corresponding previously stored statistical parameter over a predetermined limit. The predetermined limit may vary depending on the statistical parameter, type of the misoperation, and/or type of the comparison, for example. In some cases the limit may be 1 percent, while in some other cases the limit may be 50 percent, for example.

The generated signal indicating the misoperation may be transmitted from the processing unit 108 to an external computing unit 110 that is communicatively coupled to the processing unit 108. The communication between the processing unit 108 and the external computing unit may be based on one or more known communication technologies, either wired or wireless. Preferably, the generated signal indicating the misoperation may be transmitted to the external computing unit 110 in real time. The external computing 110 unit may be for example an elevator service unit, such as service personnel, service center, service company or similar. In response to receiving the signal indicating the misoperation the external computing unit 110 may be configured to instruct maintenance personnel to fix the misoperation of the elevator, for example.

The at least one statistical parameter that is detected to deviate from the previously stored statistical parameter over a predetermined limit may indicate and/or enable defining at least one of the following: type of the misoperation, reason for the misoperation, location of the misoperation. Alternatively or in addition, the signal indicating a misoperation may carry information about at least one of the following: type of the misoperation, reason for the misoperation, location of the misoperation. This enables that the reason, type, and/or location of the misoperation may be defined even before the operation of the elevator stops or at least in real time. This, in turn, enables that the misoperation may be preferably fixed before the operation of the elevator stops or at least immediately after the misoperation is detected. Furthermore, time may be saved in fixing of the misoperation, when the type, the reason, and/or the location of the misoperation may be already known beforehand due to the generated signal indicating the misoperation.

According to an example an increase in the average travel time or its variance may indicate a misoperation relating to a drive or motor of the elevator. Alternatively or in addition, an increase in the average standing time at floor or its variance may indicate a misoperation relating to at least one door of the elevator. For example misoperation of at least one door may at least partly prevent the movement of the elevator car 102. Alternatively or in addition, a decrease in the number of movements to a certain floor may indicate a misoperation of an operating panel inside the elevator car 102 or call buttons at the landing of said certain floor. The above described examples of the misoperations of the elevator that may be indicated by the deviation are only exemplary. Also other misoperations may be indicated in the context of the present invention.

Alternatively or in addition, the deviation of the at least one statistical parameter may also indicate a significant change in the usage of the elevator. Thus, the signal indicating a misoperation may also carry important information regarding the traffic of people in the building. In response to receiving the signal indicating the misoperation the external computing unit 110 may be configured to provide the information regarding the traffic of people to a building owner, for example.

Figure 3:
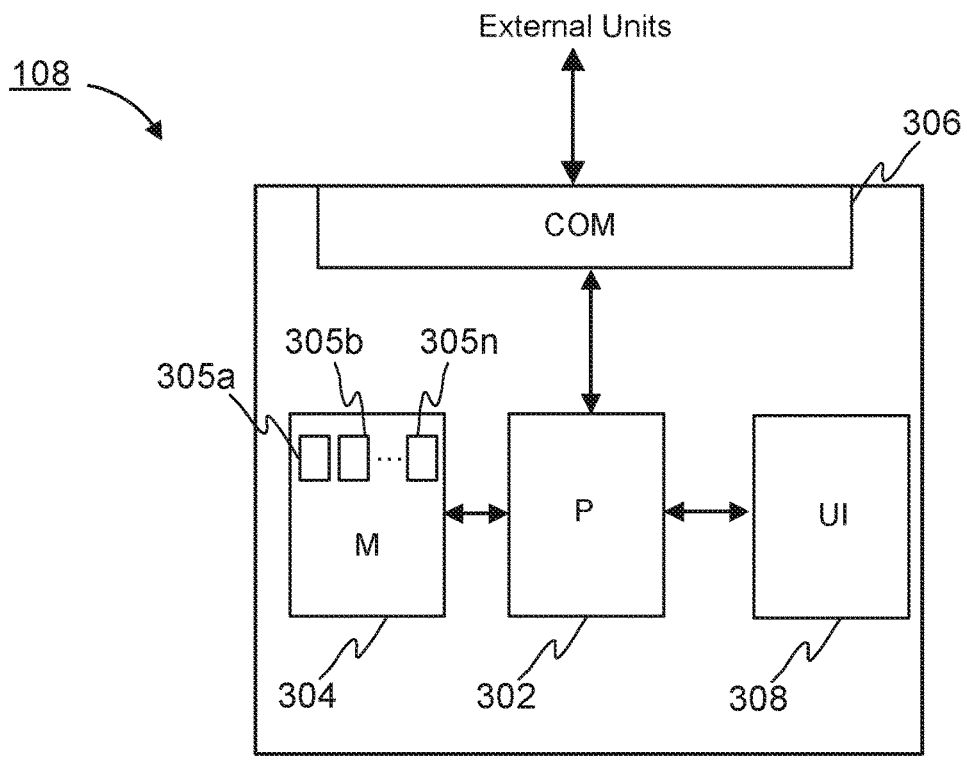
FIG. 3 illustrates schematically an example of a processing unit according to the present invention.

FIG. 3 illustrates schematically an example of the processing unit 108 according to the present invention. The processing unit 108 may comprise at least one processor 302, at least one memory 304 for storing portions of computer program code 305a-305n and any data values, a communication interface 306, and possibly at least one user interface 308. For sake of clarity, the processor 320 herein refers to any unit suitable for processing information and control the operation of the processing unit 108, among other tasks. The at least one memory 304 may be volatile or non-volatile. Furthermore, the at least one memory 304 is not limited to a certain type of memory only, but any memory type suitable for storing the described pieces of information may be applied in the context of the present invention. The elements of the processing unit 108 may be communicatively coupled to each other with e.g. an internal bus. The communication interface 306 may be based on at least one known communication technologies, either wired or wireless, in order to exchange pieces of information as described earlier. The communication interface 306 provides an interface for communication with any external unit, such as observation unit 106, external computing unit 110, database and/or external systems.

The at least one processor 302 of the processing unit 108 is at least configured to implement the operations of the processing unit 108 as described. The implementation of the operations of the processing unit 108 may be achieved by arranging the at least one processor 302 to execute at least some portion of computer program code 305a-305n stored in the at least one memory 304 causing the at least one processor 302, and thus the processing unit 108, to implement one or more operations as described. The at least one processor 302 is thus arranged to access the at least one memory 304 and retrieve and store any information therefrom and thereto. For example, the at least one processor 302 is configured to store the received data representing the movement of the elevator car 102 to the at least one memory 304. Alternatively or in addition the at least one previously stored statistical parameter of the corresponding time interval may be stored to the at least one memory 304 of the processing unit 108. The operations may also be implemented with a microcontroller solution with embedded software.

Figure 4:
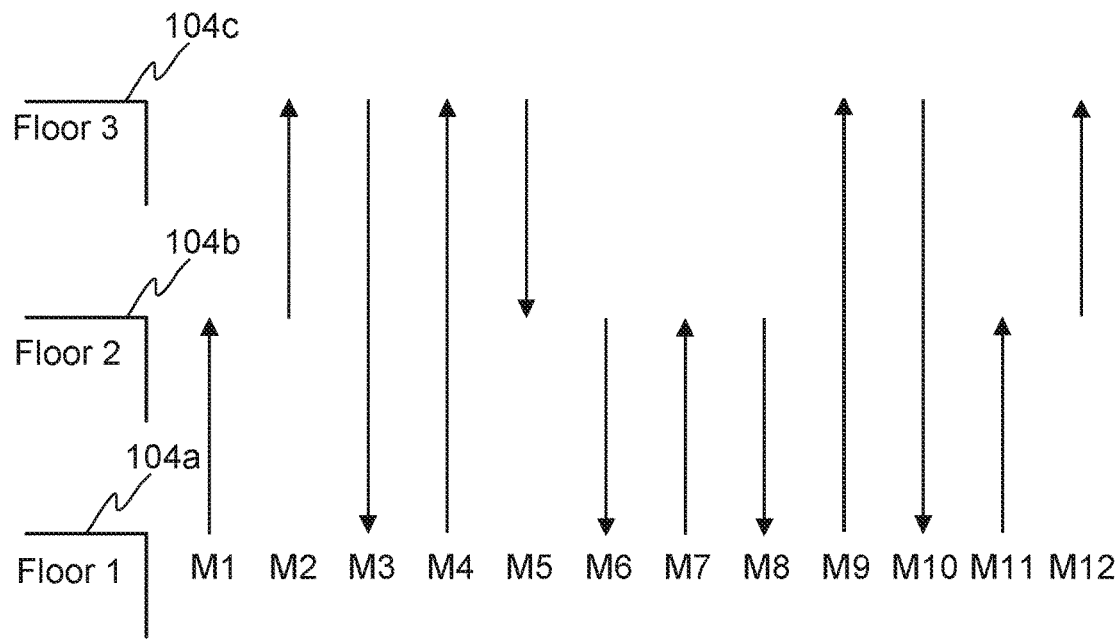
FIG. 4 illustrates schematically an example of movements of an elevator car during a predetermined time limit.

FIG. 4 illustrates an example of movements of an elevator car 102 during a predetermined time limit. In the example the elevator car 102 is moving in an elevator shaft having three floors 104a-104c. For sake of clarity the elevator car 102 and the elevator shaft are not shown in FIG. 4. The predetermined time interval, during which the movement of the elevator car 102 is observed in this example, is 15 minutes. The elevator car is observed to move 12 times during the predetermined time interval. Each movement M1-M12 of the elevator car 102 is presented with an arrow indicating the origin floor and the destination floor. The elevator car 102 may be instructed to wait in the previous destination floor for another instruction to move to the next destination floor as in the example presented in the FIG. 4. In that case the previous destination floor, where the elevator car 102 is instructed to wait, is also the origin floor for the next movement of the elevator car 102. Alternatively or in addition, the elevator car 102 may be instructed to move to a specific floor, for example first floor, to wait for another instruction to move to the next destination floor.

Table 1 illustrates at least a part of the obtained data representing the movement of the elevator car 102 for the example movements M1-M12 of the elevator car 102 during the predetermined time limit presented in FIG. 4. The travel times in this example are presented as full seconds in order to simplify the example. However, it is only a non-limiting example and the travel times are not limited to full seconds in the context of the present invention. Table 2, in turn, presents the at least one statistical parameter generated from the obtained data representing the movement of the elevator car 102 during the predetermined time interval presented in Table 1. Table 2 presents also previously stored statistical parameters of the corresponding time interval. The comparison between the generated statistical parameter from the obtained data representing the movement of the elevator car 102 during the predetermined time interval and the previously stored statistical parameter of the corresponding time interval clearly shows an increase in the average travel time, which may indicate a misoperation relating to a drive or motor of the elevator.

TABLE 1

| Movement | Origin-destination floor pair | Travel time (s) |
|---|---|---|
| M1 | 1 to 2 | 6 |
| M2 | 2 to 3 | 7 |
| M3 | 3 to 1 | 15 |
| M4 | 1 to 3 | 13 |
| M5 | 3 to 2 | 8 |
| M6 | 2 to 1 | 6 |
| M7 | 1 to 2 | 7 |
| M8 | 2 to 1 | 7 |
| M9 | 1 to 3 | 14 |
| M10 | 3 to 1 | 14 |
| M11 | 1 to 2 | 6 |
| M12 | 2 to 3 | 7 |

TABLE 2

| Origin-destination floor pair | Previously stored | | Generated from obtained data | |
|---|---|---|---|---|
| | Number of occurrences | Average travel time (s) | Number of occurrences | Average travel time (s) |
| 1 to 2 | 3 | 5 | 3 | 6.5 |
| 1 to 3 | 2 | 10 | 2 | 13.5 |
| 2 to 1 | 2 | 5 | 2 | 6.5 |
| 2 to 3 | 1 | 5 | 2 | 7 |
| 3 to 1 | 2 | 10 | 2 | 14.5 |
| 3 to 2 | 2 | 5 | 1 | 8 |

The observation unit 106 and the processing unit 108 may be implemented as one unit. Preferably, the observation unit 106 and the processing unit 108 are separate units as shown in FIG. 1. According to one embodiment of the present invention the observation unit 106 may be implemented as a discrete device, which enables that no connection to the elevator control system is required. The discrete device may be fixed to the elevator car 102 as shown in FIG. 1. One advantage of implementing the observation unit 106 as a discrete device is that the elevator system according to the present invention may be implemented in any kind of elevator, even in a mechanically operating elevator. The electricity for the observation unit 106 may be taken from electricity of the elevator. Alternatively or in addition, the observation unit 106 may comprise a battery for generating electricity for the observation unit 106.

Alternatively, the observation unit 106 may be implemented as a part of the elevator control system. The elevator control system may comprise at least one sensor and at least one elevator control unit. The at least one elevator control unit may comprise at least one processor, at least one memory being volatile or non-volatile for storing portions of computer program code and any data values, a communication interface, and possibly one or more user interface units. The mentioned elements may be communicatively coupled to each other with e.g. an internal bus. The communication interface may provide interface for communication with any external unit. The communication interface may be based on one or more known communication technologies, either wired or wireless, in order to exchange pieces of information. The at least one processor of the elevator control unit is at least configured to control the operation of the elevator. For sake of clarity, the processor herein refers to any unit suitable for processing information and control the operation of the elevator control unit, among other tasks. The operations may also be implemented with a microcontroller solution with embedded software. Similarly, the at least one memory is not limited to a certain type of memory only, but any memory type suitable for storing the described pieces of information may be applied in the context of the present invention.

Alternatively or in addition, the processing unit 108 may be implemented as a part of the elevator control system. Alternatively, the processing unit 108 may be implemented as an external unit, such as remote server or cloud server, for example. The external unit herein means a unit that locates separate from the elevator. The external unit may be communicatively coupled to the observation unit 106. The use of the external unit as the processing unit 108 enables that sufficiently large computational resources may be available compared to a use of an internal processing unit.

Figure 5:
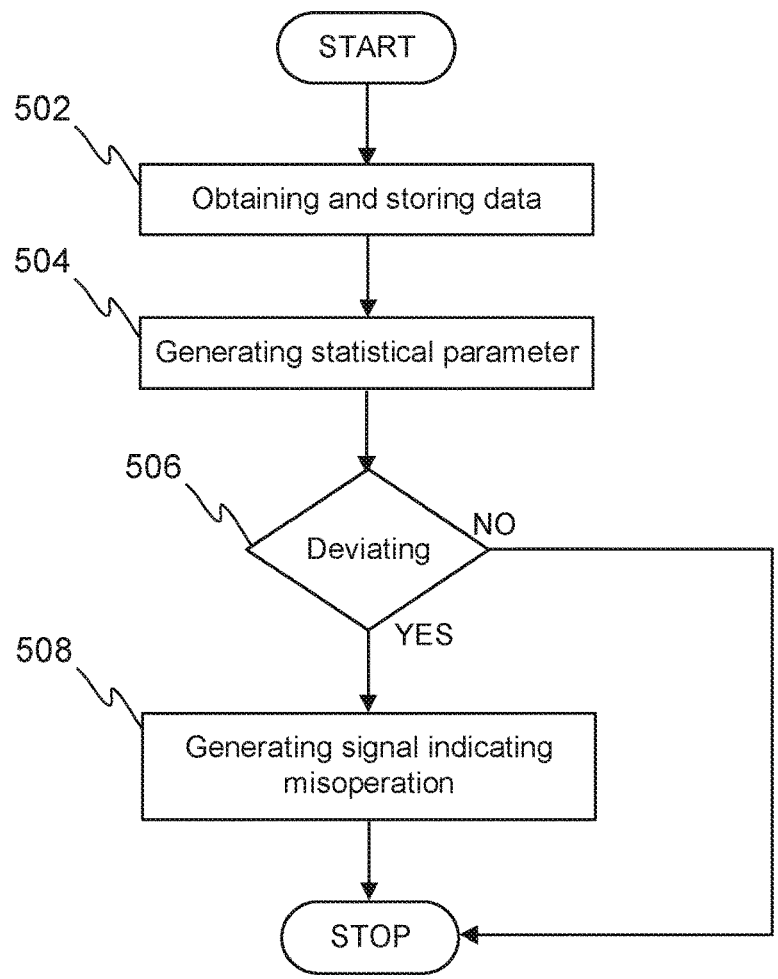
FIG. 5 illustrates schematically an example of a method according to the present invention.

FIG. 5 illustrates an example of a method for observing a misoperation of elevator according to the present invention as a flow chart. Data representing movement of an elevator car during a predetermined time interval is obtained and stored at step 502 as described above. The data is obtained by the observation unit 106 and transmitted and stored to the processing unit 108. At least one statistical parameter from the received data representing the movement of the elevator car 102 is generated at step 504 as described above. The at least one generated statistical parameter is compared to at least one previously stored statistical parameter of the corresponding time interval at step 506 as also described above. A signal indicating a misoperation of the elevator is generated in response to a detection that the at least one generated statistical parameter deviates from the corresponding previously stored statistical parameter over a predetermined limit at step 508 as described above.

One advantage of the above described present invention is that a misoperation of an elevator may be detected before the operation of the elevator is stopped because of the misoperation. Furthermore, the present invention enables that a misoperation of an elevator may be detected remotely. The remote detection may also enable to detect a misoperation or define the reason for the misoperation, which may be difficult or even impossible to detect directly from the elevator.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An elevator system for observing a misoperation, the elevator system comprising:
   an observation unit configured to:
      obtain data representing movement of an elevator car during a predetermined time interval, the data representing the movement of the elevator car being at least one of the following, origin and destination floor pairs, travel times between the origin floor and the destination floor, and standing times at the origin floor, and
      transmit the obtained data to a processing unit; and
   the processing unit configured to:
      receive and store the data representing the movement of the elevator car,
      generate at least one statistical parameter from the received data,
      compare the at least one generated statistical parameter to at least one previously stored statistical parameter of a corresponding time interval, the corresponding time interval being a same time interval as the predetermined time interval at least one comparison period before the predetermined time interval, and
      generate a signal indicating a misoperation in response to a detection that the at least one generated statistical parameter deviates from the corresponding previously stored statistical parameter over a predetermined limit.

2. The elevator system according to claim 1, wherein the statistical parameter is derived from at least one of the following: total number occurrences of each origin and destination floor pair, average travel time between the origin and destination floor, standard deviation of the travel time between the origin and destination floor, variance of the travel time between the origin and destination floor, average standing time at the origin floor, standard deviation of the standing time at the origin floor, variance of the standing time at the origin floor.

3. The elevator system according to claim 1, wherein the comparison is based on a statistical test.

4. The elevator system according to claim 1, wherein the observation unit comprises at least one sensor for obtaining the data representing the movement of the elevator car.

5. The elevator system according to claim 1, wherein the observation unit is implemented as one of the following: a discrete device fixed to the elevator car, a part of an elevator control system.

6. The elevator system according to claim 1, wherein the processing unit is an external unit communicatively coupled to the observation unit.

7. The elevator system according to claim 1, wherein the generated signal indicating the misoperation is transmitted to an external computing unit communicatively coupled to the processing unit.

8. A method for observing a misoperation of elevator, the method comprising:
   obtaining and storing data representing movement of an elevator car during a predetermined time interval, the data representing the movement of the elevator car being at least one of the following origin and destination floor pairs, travel times between the origin floor and the destination floor, and standing times at the origin floor;
   generating at least one statistical parameter from the received data;
   comparing the at least one generated statistical parameter to at least one previously stored statistical parameter of a corresponding time interval, the corresponding time interval being a same time interval as the predetermined time interval at least one comparison period before the predetermined time interval; and
   generating a signal indicating a misoperation in response to a detection that the at least one generated statistical parameter deviates from the corresponding previously stored statistical parameter over a predetermined limit.

9. The elevator system according to claim 1, wherein in response to generating the signal indicating the misoperation, the processing unit is configured to instruct maintenance personnel to fix the misoperation of the elevator.

10. The method according to claim 8, further comprising:
    instructing maintenance personnel to fix the misoperation of the elevator in response to generating the signal indicating the misoperation.

* * * * *